(12) United States Patent
Raveendran et al.

(10) Patent No.: US 8,948,262 B2
(45) Date of Patent: Feb. 3, 2015

(54) METHOD AND APPARATUS FOR USING FRAME RATE UP CONVERSION TECHNIQUES IN SCALABLE VIDEO CODING

(75) Inventors: Vijayalakshmi R. Raveendran, San Diego, CA (US); Gordon Kent Walker, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 1896 days.

(21) Appl. No.: 11/173,121

(22) Filed: Jul. 1, 2005

(65) Prior Publication Data

US 2006/0002465 A1 Jan. 5, 2006

Related U.S. Application Data

(60) Provisional application No. 60/585,154, filed on Jul. 1, 2004, provisional application No. 60/665,816, filed on Mar. 22, 2005.

(51) Int. Cl.
*H04N 7/12* (2006.01)
*H04N 11/02* (2006.01)
(Continued)

(52) U.S. Cl.
CPC ..... *H04N 19/00672* (2013.01); *H04N 19/0043* (2013.01); *H04N 19/00127* (2013.01); *H04N 19/00351* (2013.01); *H04N 19/00145* (2013.01); *H04N 19/00278* (2013.01); *H04N 19/00175* (2013.01); *H04N 19/00036* (2013.01); *H04N 19/00721* (2013.01); *H04N 19/00751* (2013.01)
USPC ............ 375/240.15; 375/240.16; 375/240.21; 725/9

(58) Field of Classification Search
CPC .................... H04N 19/0043; H04N 19/00672; H04N 19/00127; H04N 19/00351; H04N 19/0075; H04N 19/00278; H04N 19/00175; H04N 19/00036; H04N 19/00721; H04N 19/00145
USPC ................................................... 375/240.15
See application file for complete search history.

(56) References Cited

U.S. PATENT DOCUMENTS 3,670,096 A 6/1972 Candy et al.
5,168,394 A 12/1992 Sasho
(Continued)

FOREIGN PATENT DOCUMENTS

CL 163-07 1/2007
CL 786-07 3/2007
(Continued)

OTHER PUBLICATIONS

Flierl et al., "Generalized B Pictures and the DRaft H.264/AVC Video-Compresiion Standard", IEEE Trans. Circuit and Systems for Video Technology, vol. 13, No. 7, pp. 587-597, 2003.*
(Continued)

*Primary Examiner* — Hee-Yong Kim
(74) *Attorney, Agent, or Firm* — Brent A. Boyd

(57) ABSTRACT

A method for encoding a video stream includes partitioning the video stream into a main layer having a plurality of main layer frames, and an interpolated layer having a plurality of interpolated layer frames; interpolating a frame rate up conversion (FRUC) frame; and encoding the plurality of main layer frames in the interpolated layer with the assistance of the main FRUC frame. A video encoder implementing the method is also described.

8 Claims, 8 Drawing Sheets

(51) Int. Cl.
*H04N 11/04* (2006.01)
*H04H 60/33* (2008.01)
*H04N 19/567* (2014.01)
*H04N 19/31* (2014.01)
*H04N 19/132* (2014.01)
*H04N 19/19* (2014.01)
*H04N 19/137* (2014.01)
*H04N 19/176* (2014.01)
*H04N 19/147* (2014.01)
*H04N 19/109* (2014.01)
*H04N 19/577* (2014.01)
*H04N 19/587* (2014.01)

(56) References Cited

U.S. PATENT DOCUMENTS

| | | |
|---|---|---|
| 5,198,902 A | 3/1993 | Richards et al. |
| 5,387,947 A | 2/1995 | Shin |
| 5,394,196 A | 2/1995 | Robert |
| 5,784,107 A | 7/1998 | Takahashi |
| 5,844,616 A | 12/1998 | Collet et al. |
| 5,995,154 A | 11/1999 | Heimburger |
| 6,008,865 A | 12/1999 | Fogel |
| 6,043,846 A | 3/2000 | Shen et al. |
| 6,101,220 A | 8/2000 | Ando |
| 6,192,079 B1 | 2/2001 | Sharma et al. |
| 6,208,760 B1 | 3/2001 | De Haan et al. |
| 6,229,570 B1 | 5/2001 | Bugwadia et al. |
| 6,229,925 B1 | 5/2001 | Alexandre et al. |
| 6,330,535 B1 | 12/2001 | Yasunaga et al. |
| 6,345,247 B1 | 2/2002 | Yasunaga et al. |
| 6,404,901 B1 | 6/2002 | Itokawa |
| 6,424,676 B1 | 7/2002 | Kono et al. |
| 6,480,541 B1 | 11/2002 | Girod et al. |
| 6,560,371 B1 | 5/2003 | Song et al. |
| 6,597,738 B1 | 7/2003 | Park et al. |
| 6,618,439 B1* | 9/2003 | Kuo et al. ............. 375/240.16 |
| 6,625,333 B1 | 9/2003 | Wang et al. |
| 6,654,420 B1 | 11/2003 | Snook |
| 6,704,357 B1 | 3/2004 | Ketcham |
| 6,728,317 B1* | 4/2004 | Demos ............... 375/240.21 |
| 7,003,038 B2 | 2/2006 | Divakaran et al. |
| 7,042,941 B1 | 5/2006 | Laksono et al. |
| 7,075,986 B2 | 7/2006 | Girod et al. |
| 7,116,716 B2 | 10/2006 | Ma et al. |
| 7,215,710 B2 | 5/2007 | Yamada et al. |
| 7,280,708 B2 | 10/2007 | Song et al. |
| 7,343,044 B2 | 3/2008 | Baba et al. |
| 7,457,471 B2 | 11/2008 | Song et al. |
| 7,577,196 B2 | 8/2009 | Ducloux et al. |
| 2004/0017852 A1* | 1/2004 | Garrido et al. .......... 375/240.16 |
| 2005/0005301 A1* | 1/2005 | Song et al. ................ 725/90 |
| 2005/0265451 A1 | 12/2005 | Shi et al. |
| 2006/0018383 A1 | 1/2006 | Shi et al. |
| 2006/0039476 A1 | 2/2006 | Watanabe |
| 2006/0159359 A1 | 7/2006 | Lee |
| 2006/0165176 A1 | 7/2006 | Raveendran et al. |
| 2007/0064800 A1 | 3/2007 | Ha |
| 2007/0230563 A1 | 10/2007 | Tian et al. |
| 2007/0230564 A1 | 10/2007 | Chen et al. |
| 2007/0230578 A1 | 10/2007 | Shi et al. |
| 2008/0002862 A1 | 1/2008 | Matsugu et al. |
| 2008/0112606 A1 | 5/2008 | Lee et al. |
| 2013/0188742 A1 | 7/2013 | Raveendran et al. |

FOREIGN PATENT DOCUMENTS

| | | |
|---|---|---|
| EP | 0018856 | 11/1980 |
| EP | 0782343 A2 | 7/1997 |
| EP | 0881836 A1 | 12/1998 |
| EP | 0883298 A2 | 12/1998 |
| EP | 1287492 | 3/2003 |
| EP | 1357750 | 10/2003 |
| EP | 1369820 | 12/2003 |
| EP | 1383322 | 1/2004 |
| EP | 1481546 | 12/2004 |
| EP | 1617678 A2 | 1/2006 |
| GB | 2316568 A1 | 2/1998 |
| JP | 08191448 A | 7/1996 |
| JP | 08223536 A | 8/1996 |
| JP | 8256340 A | 10/1996 |
| JP | 10066033 A | 3/1998 |
| JP | 11112940 A | 4/1999 |
| JP | 11177940 A | 7/1999 |
| JP | H11510937 A | 9/1999 |
| JP | 2000134585 A | 5/2000 |
| JP | 2000512091 | 9/2000 |
| JP | 2003515987 T | 5/2003 |
| JP | 2003274415 | 9/2003 |
| JP | 2003348596 A | 12/2003 |
| JP | 2004112229 | 4/2004 |
| JP | 2004166183 A | 6/2004 |
| JP | 2005526457 A | 9/2005 |
| JP | 2008526119 A | 7/2008 |
| JP | 2009510937 | 3/2009 |
| JP | 2009532990 A | 9/2009 |
| JP | 2010136383 A | 6/2010 |
| KR | 1019990082104 | 11/1999 |
| KR | 20030073254 A | 9/2003 |
| RU | 2182727 | 5/2002 |
| RU | 2201654 | 3/2003 |
| TW | 480885 B | 3/2002 |
| WO | WO9216071 A1 | 9/1992 |
| WO | 9728507 | 8/1997 |
| WO | 9746020 A2 | 12/1997 |
| WO | 9746022 A2 | 12/1997 |
| WO | 9922525 A1 | 5/1999 |
| WO | WO0133864 A1 | 5/2001 |
| WO | WO2004025965 A1 | 3/2004 |
| WO | WO-2005079070 A1 | 8/2005 |
| WO | 2006007527 | 1/2006 |
| WO | WO2007115325 | 10/2007 |

OTHER PUBLICATIONS

Liu et al., "Adaptive Video Multcast over the Internet", IEEE Computer Society, 2003, pp. 22-33.*

"Advanced Video Coding for Generic Audiovisual Services," ITU -T Standard Pre-Published (P), International Telecommunication Union, Geneva, N. H264 3/5, Mar. 1, 2005, XP002448156.

Liu et al, "MCI-Embedded Motion-Compensated Prediction for Quality Enhancement of Frame Interpolation", Proceedings of the SPIE—The Internations Society for Optical Engineering, Multimedia Systems and Applications III, vol. 4209, Nov. 6, 2000, pp. 251-261, XP002351712, Boston, MA, USA, 2001, abstract, Section 1, pp. 251-252, Section 2, pp. 253-254, Section 4, pp. 256-257.

Puri et al, "An Interframe Coding Scheme for Packet Video" Proceedings of the SPIE, Bellingham, VA, US, vol. 1199, No. Part 3: Nov. 8, 1989, pp. 1610-1619, XP000568683, ISSN: 0277-786X abstract Section 3., p. 1611 Section 5., pp. 1612-1613 with figures 2 and 4.

Puri et al "Video Coding With Motion-Compensated Interpolation for CD-ROM Applications" Signal Processing. Image Communication, Elsevier Science Publihers, Amsterdam, NL vol. 2, No. 2, Aug. 1, 1990, pp. 127-144, XP000243473 ISSN: 0923-5965 abstract Section 4, pp. 130-132.

Sasai et al, "B-Picture Coding With Motion-Compensated Frame Rate up Conversion" Proceedings of the SPIE—The International Society for Optical Engineering, Image and Video Communications and Processing 2005, vol. 5685, Jan. 18, 2005, p. 792-800, XP002351713 San Jose, CA, USA, 2005 abstract Sections 3.1 and 3.3.

Sullivan et al: "Rate-Distortion Optimization for Video Compression" IEEE Signal Processing Magazine, IEEE Service Center, Piscataway, NJ, US, vol. 15, No. 6, Nov. 1998, pp. 74-90, XP001064929, ISSN: 1053-5888 Sub-section "Distortion Measures", pp. 78-79 Sub-section "Optimization Techniquest", pp. 80-81 Sub-sub-section "Variable Block Sizes", p. 82, paragraph entilted "Case 1", p. 82 Sub-section "Infra/Inter/Skip Mode Decision", pp. 84-85 Sub-section "Comparison to Other Encoding Strategies", p. 87-88.

(56) References Cited

OTHER PUBLICATIONS

Gallant et al: "Efficient scalable DCT-based video coding at low bit rates" Image Processing ,1999. ICIP 99. International Conference on Kobe, Japan Oct. 24-28, 1999, Piscataway, NJ, USA, IEEE, US, vol. 3, Oct. 24, 1999, pp. 782-786, XP010368741 ISBN: 0/7803-5467-2 the whole document.

Thomas Wiegand, "Joint Model No. 1, Revision 1 (JM-IRL)" ITU Study Group 16-Video Coding Experts Group, Dec. 3, 2001, pp. 1, 3-75, XP001086627 Section 5, pp. 40-44 Appendix I, pp. 50-57.

Fukunaga et al: "MPEG-4 Video Verification Model Version 16.0" internation organization for standardization—organisation internationale de normalisation, vol. N3312, Mar. 2000, pp. 1-380, XP000861688 Section 3.7, pp. 81-88.

International Search Report—PCT/US05/023333, International Search Authority—European Patent Office—Jun. 19, 2006.

Witten Opinion of the International Searching Authority—PCT/US05/023333, European Patent Office—Jan. 1, 2007.

International Preliminary Report on Patentability—PCT/US05/023333, International Search Authority—European Patent Office—Jan. 9, 2007.

"Rate-Constrained Coder Control and Comparison of Video Coding Standards," IEEE Transactions on Circuits and Systems for Video Technology, vol. 13, No. 7, pp. 688-703, (Jul. 2003).

A. Kaup et al.: "Efficient prediction of uncovered background in inter-frame coding using spatial extrapolation" in Proc. ICASSP, vol. 5, pp. 501-504, 1994.

G. Dane and T.Q. Nguyen, "Motion vector processing for frame rate up conversion" in IEEE international Conference on Acoustics, Speech, and Signal Processing, pp. 309-312, May 2004.

Ghandi M. et al., Layered H.264 Video Transmission with Hierarchical QAM [Online] May 1, 2005, pp. 1-17, xp002446009, URL:http//mahdi/ghandi.ws/papers/jvcir06.

R. Thoma et al.: "Motion compensating interpolation considering covered and uncovered background", Signal Processing: Image Compression 1, pp. 191-212, 1989.

Schwarz H et al., "MCTF and Scalability Extension of H. 264/AVC," Internet Citation, [Online] Dec. 15, 2004, XP002368924, URL: http;//ip.hhi.de/imagecom_G1/savcw/documents/PCS2004.

Schwarz H. et al., "Combined Scalability Support for the Scalable Extension of H.264/AVC," Multimedia and Expo, 2005. ICME 2005. IEEE International Conference on Ansterdam, The Netherlands, Jul. 6, 2006, pp. 446-449, XP010843292.

T. Kuo et al.: "Motion-compensated interpolation for low-bit-rage video quality enhancement" in Proc. SPIE Applications of Digital Image Processing, vol. 3460, p. 277-288, 1998.

Telecommunication Standarization Sector of ITU: "Recommendation H.264 Advanced Video Coding for Generic Audiovisual Services," ITU-T Recommendations, International Telecommendation Union, Geneva, CH, No. H264, Mar. 2005.

TIA-1099 "Forward Link Only Air Interface Specification for Terrestrial Mobile Multimedia Multicast" Aug. 2006.

Bruijn et al., "Efficient Video Coding Integrating MPEG-2 and Picture-Rate Conversion," IEEE Transactions on Consumer Eleceronics, IEEE Service Center, New York, NY, USA, vol. 48, No. 3, Aug. 2002, pp. 688-693,XP002312635.

Castagno R., et al., "A Method for Motion Adaptive Frame Rate Up-Conversion," IEEE Transactions on Circuits and Systems for Video Technology, IEEE Service Center, Piscataway, NJ, vol. 6, No. 5, Oct. 1996, pp. 436-445.

Inazumi Y., et al., "Estimation of the Optimal Frame Rate for Video Communications Under Bit-Rate Constraints,"Electronics & Communications in Japan, Part 1—Communications, Scripta Technica. New York, vol. 86, No. Dec. 2003, pp. 54-67.12, Pant.

Pyun J-Y, et al., "Scene-Adaptive Frame-Layer Rate Control for Low Bit Rate Video,"—IEICE Transactions on Fundamentals of Electronics, Communications and Computer Sciences, Institute of Electronics Information and Comm. Eng. Tokyo, JP, vol. E86-A, No. 10, Oct. 2003, pp. 2618-2622.

Sasai H., et al., "Frame-rate up-conversion using reliable analysis of transmitted motion information," Acousitcs,Speech, and Signal Processing, 2004. Proceedings. ICASSP '04, IEEE International Conference on Montreal, Quebec,Canada, vol. 5, May 17, 2004, pp. 257-260.

Tao Chen Ed—Institute of Electrical and Electronics Engineers: "Adaptive temporal interpolation using bidirectional motion estimation and compensation," Proceedings 2002 International Conference on Image Processing. ICIP2002.Rochester, NY, Sep. 22-25, 2002, International Conference on Image Processing, New York, IEEE, vol. 2 of 3, Sep. 22, 2002, pp. 313-316.

A.M. Tekalp, "Digital Video Processing", Oppenheim, ed, Prentice Hall Signal Processing Series, Upper Saddle River, NJ 1995.

Dane G., et al., "Encoder-Assisted Adaptive Video Frame Interpolation," Acoustics, Speech, and Signal Processing, 2005. Proceedings, (ICASSP '05). IEEE International Conference on, Philadelphia, PA, Piscataway, NJ, IEEE, vol. 2, Mar. 18, 2005, pp. 349-352.

Kim et al.,: A new video interpolation technique based on motion-adaptice subsampling This work was supported by Jeoju University, Korea. IEEE Transactions on Consumer Electronics, IEEE Service Center, New York, U.S. LNKD-DOI:10.1109/30.793602, vol. 45, No. 3, Aug. 1, 1999, pp. 782-787, XP011083800.

Lee S-H et al: "Weighted-adaptive motion-compensated frame rate up-conversion", IEEE Transactions on Consumer Electronics, IEEE Service Center, New York, NY, US, vol. 49, No. 3, Aug. 1, 2003, pp. 485-492, XP002290775, ISSN: 0098-3063, DOI: 10.1109/TCE.2003.1233759.

Sung-Hee Lee et al: "Adaptive motion-compensated interpolation for frame rate up-conversion" IEEE Transactions on Consumer Electronics, vol. 48, No. 3, Aug. 2002, pp. 444-450.

Taiwan Search Report—TW094122411-TIPO—Aug. 26, 2011.

Yoshiritsu Hatori, et al.,. (written by), Digital Image Network, 1st edition, The Institute of Image Information and Television Engineers (edited by), Kabushiki Kaisha Koronasha, Dec. 25, 2002, pp. 22 to 23, ISBN: 4-339-01262-9.

Hur J.H., et al.,"H. 264 to MPEG-4 Transcoding Using Block Type Information," Proceedings of the 2005 IEEE Region 10 Conference (TENCON 2005), 2005, pp. 1-6, ISBN: 0-7803-9311-2.

Kikuchi Y., et. al., "Improved multiple frame motion compensation using frame interpolation", Joint Video Team(JVT) of ISO/IEC MPEG & ITU-TVCEG (ISO/IEC JTC1/ SC29/WG11 and ITU-T SG16 Q.6), Document: JVT-B075, Jan. 29-Feb. 1, 2002, [online] Jan. 17, 2005, <URL:http://wftp3.itu.int/av-arch/jvt-site/2002_01_Geneva/JVT-B075.doc>.

Ono S., et al., "Ubiquitous Technology: High Efficiency Encoding of Dynamic Images—MPEG-4 and H.264 ," Japan, Ohmsha Ltd., Apr. 20, 2005, 1st ed., Nos. 61-63 and 67, pp. 129, ISBN: 4-274-20060-4.

Sekiguchi S., et al., "Study of Dynamic Network-Adaptive Transcoder," Proceedings of the 66th (2004) National Conference of the Information Processing Society of Japan, The Information Processing Society of Japan, Mar. 9, 2004, vol. 5, pp. 201-204.

Wiegand T., "H.26L Test Model Long-Term No. 9 (TML-9) draft0", ITU—Telecommunications Standardization Sector STUDY GROUP 16 Video Coding Experts Group (VCEG), Document VCEG-N83 d1, 2001.

\* cited by examiner

METHOD AND APPARATUS FOR USING FRAME RATE UP CONVERSION TECHNIQUES IN SCALABLE VIDEO CODING

CLAIM OF PRIORITY UNDER 35 U.S.C. §119

The present Application for Patent claims priority to Provisional Application No. 60/585,154 entitled "Method and Apparatus for Using Frame Rate up Conversion (FRUC) Technique in Scalable Video Coding" filed Jul. 1, 2004, and Provisional Application No. 60/665,816 entitled "Method and Apparatus for Using Frame Rate Up Conversion Techniques in Scalable Video Coding" filed Mar. 22, 2005, assigned to the assignee hereof and hereby expressly incorporated by reference herein.

BACKGROUND

1. Field

The present invention relates generally to video compression, and more particularly, to a method and apparatus for using Frame Rate Up Conversion (FRUC) techniques in scalable video coding.

2. Background

Rate adaptation in video and audio compression has typically been achieved through scalability (SNR, spatial, temporal) techniques, switching between bit streams coded at various bit-rates and multiple bit rate modes wherein the encoder delivers the content as a variety of media streams at variable bandwidths to the server. The server then delivers the appropriate stream based on the network conditions and/or the target audience.

Due to the limited bandwidth available in low bit-rate video application, some encoders apply the temporal sampling technique (also referred to as frame skipping) to meet the required compression ratios. Under this scenario, frames in the input sequence are periodically dropped from the encoding process and therefore not transmitted. Thus, instead of the whole input sequence, the decoder receives only partial information in the temporal direction. As a result, temporal artifacts such as motion jerkiness are introduced in the receiving side. Frame rate up conversion (FRUC) is used at the decoder to re-generate the skipped frames in order to reduce the temporal artifacts. Various techniques have been proposed for FRUC. Typically, motion compensated interpolation (MCI) technique provides the best solution in temporal FRUC applications. However, it is desirable to optimize the implementation of FRUC techniques on the decoder while minimizing the bit-rate of the video stream.

SUMMARY

Various approaches for using FRUC techniques in scalable video coding, and specifically, enabling the integration of FRUC compression techniques on the encoder side, also referred to as encoder assisted-FRUC (EA-FRUC), are described herein.

In one embodiment, a method for encoding a video stream includes the steps of partitioning the video stream into a main layer having a plurality of main layer frames, and an interpolated layer having a plurality of interpolated layer frames; interpolating an FRUC frame; and, encoding the plurality of main layer frames in the main layer with the assistance of the interpolated FRUC frame.

In another embodiment, EA-FRUC is implemented as a computer-readable medium having instructions stored thereon, the stored instructions, when executed by a processor, cause the processor to perform a method for encoding a video stream. The method includes the steps of partitioning the video stream into a main layer having a plurality of main layer frames, and an interpolated layer having a plurality of interpolated layer frames; interpolating a frame rate up conversion (FRUC) frame; and, encoding the plurality of main layer frames in the main layer with the assistance of the interpolated FRUC frame.

In still yet another embodiment, the system is implemented as a video encoder processor receiving a video stream. The video encoder processor including a frame rate up conversion (FRUC) module, the FRUC module generating a plurality of FRUC frames from the received video stream; a rate distortion cost (RD_cost) calculation module coupled to the FRUC module, the RD_cost calculation module receiving the plurality of FRUC frames and calculating a F frame macroblock RD_cost based on a macroblock in one of the plurality of FRUC frames; and, a mode decision module coupled to the RD_cost calculation module, the mode decision module configured to compare the FRUC frame macroblock RD_cost based on the macroblock in one of the plurality of FRUC frames to a B frame macroblock RD_cost for a corresponding macroblock in a corresponding B frame.

Other objects, features and advantages will become apparent to those skilled in the art from the following detailed description. It is to be understood, however, that the detailed description and specific examples, while indicating embodiments of the invention, are given by way of illustration and not limitation. Many changes and modifications within the scope of the description may be made without departing from the spirit thereof, and the invention includes all such modifications.

BRIEF DESCRIPTION OF THE DRAWINGS

The invention may be more readily understood by referring to the accompanying drawings in which.

Like numerals refer to like elements throughout the drawings.

DETAILED DESCRIPTION

Figure 1:
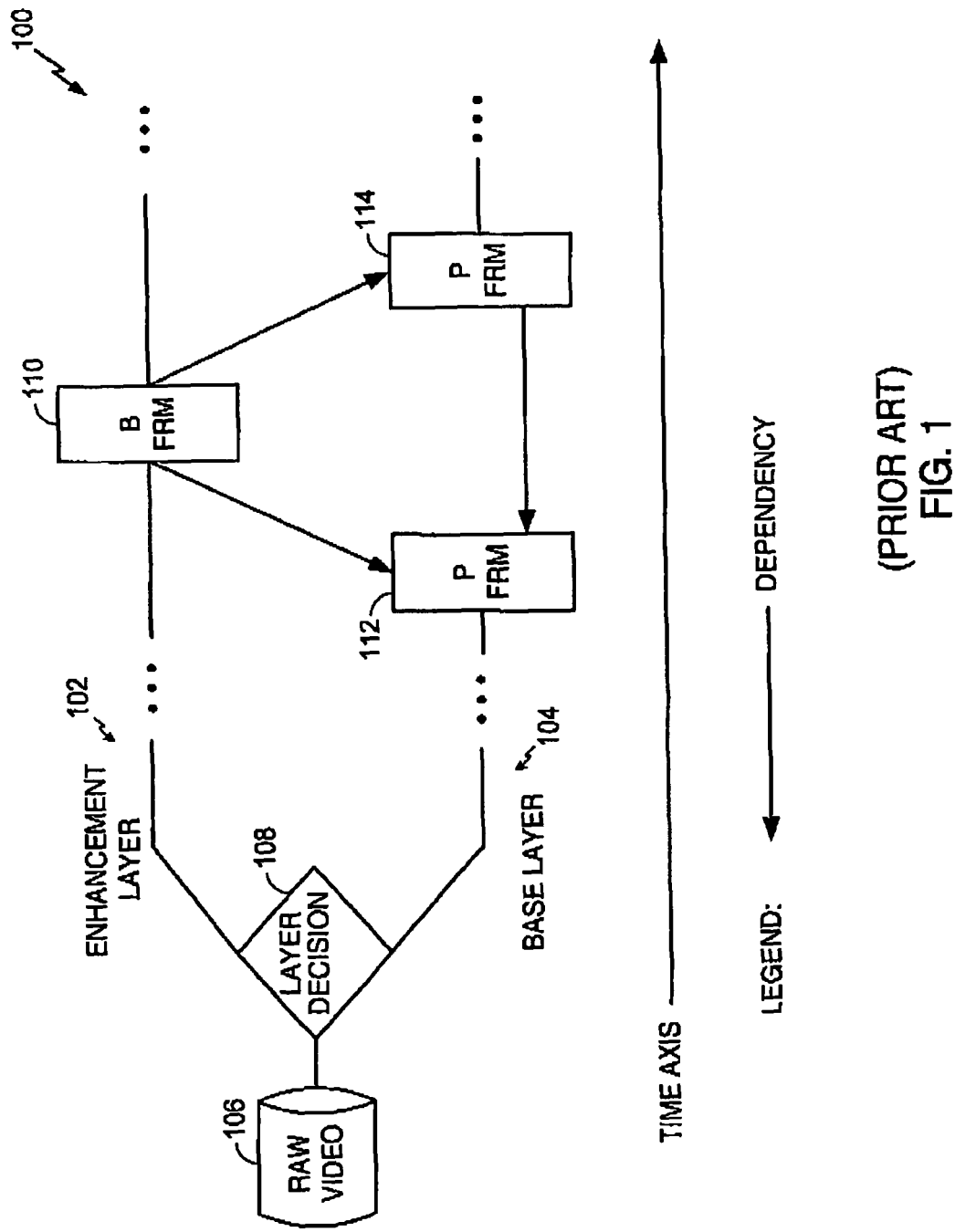
FIG. 1 is a diagram illustrating a conventional two-layered encoding with a base layer and an enhancement layer.

Although the FRUC technique is typically used on the decoder side, it can be extended to the encoder side. Specifically, it is useful to utilize the FRUC frame as an additional prediction mode for the motion compensated frame. By adding an extra prediction mode for the inter-predicted frame, bit-rate savings can be achieved. In other words, compression ratios for the same reconstructed visual quality can be improved.

For standards-based video encoding, the bit-stream syntax has to be augmented due to the introduction of the extra FRUC mode. However, compliance to standard syntax can be retained by flagging the use of FRUC in predicted frames in the user-data field or Supplemental Enhancement Information (SEI) fields as in the H.264 video coding standard promulgated by the International Telecommunications Union, Telecommunications Standardization Sector (ITU-T). This feature is particularly advantageous in video transmission systems where the FRUC function is performed by the decoder. Further, closed systems, where modifications to the video decoder are possible, stand to benefit significantly in terms of transmission bandwidth and compression efficiency.

On the decoder side, upon receiving the transmitted bit-streams and the reconstructed Intra-Picture (I)/Prediction-Picture (P) (I/P) frames, the FRUC frames are interpolated utilizing the same techniques adopted on the encoder side. The inter-frame is then reconstructed based on both the reconstructed I/P frames and the FRUC frame of the same time instance. As long as the same technique is utilized in both the decoder and encoder sides, there will be no error or drift problems.

An alternate application of the system would be in scalable video coding.

When temporal scalability is employed, some predictive frames, particularly Bi-directional predicted/interpolated picture frames are transmitted in the enhancement layer; and I and P frames are transmitted in the base layer. In such a scenario, if the enhancement layer is not received or requested, the frame rate of the reconstructed video at the decoder is lower than the source frame rate. Sending the differential of a FRUC frame and a B frame in the base layer could enable reconstruction of a close approximation of the B frame through FRUC at the decoder. Results show that the cost of the differential (in bits) is significantly less and hence does not impact the bit rate of base layer video. The differential can be computed as a pure residual of FRUC and the true B frame, through thresholding (or quantization) to limit information to prominent regions (e.g., holes that cannot be reconstructed by FRUC), or as a refinement to known FRUC methods (e.g., true motion vector data or quantized true motion vector data). Again, such differential information can be carried in "user data" fields of standard syntax or in SEI fields as in the H.264 standard.

Based on the availability of the decoder resources, different FRUC techniques can be selected based on their degree of computational complexity. A point to note is that FRUC typically expends less computational cycles than decoding a B frame since FRUC involves simple 3 or 5-tap filtering and motion estimation (ME) on a small percentage of the frame, in a relatively small search space; as compared to bi-directional motion compensation (MC) on all macroblocks (sometimes more than one motion compensation (MC)/Macroblock (MB)) of the B frame. FRUC offers granularity in complexity levels based on the level of refinement adopted to reconstruct the intermediate frame at the small cost of visual quality.

Typically, B frames are computationally more expensive than P frames, and I frames are the least expensive of the three types of frames. In this regard, an added advantage of the system and its extension to scalable video coding is in saving computational cycles and thus valuable power in handheld devices (which translates to longer standby and talk times in such devices). The power savings is realized irrespective of whether a B frame is received or not as, based on available cycles, the decoder can choose to decode the B frame or reconstruct an interpolated frame through FRUC and apply refinements from the differential data.

Block based FRUC algorithms can be classified based on increasing computational complexity:

1. Non-motion compensated algorithms such as frame repetition and frame averaging;
2. Bi-linear motion compensated interpolation (MCI) without MV processing;
3. MCI with MV processing; and,
4. Seeded ME assisted MCI with MV processing.

Any of the above FRUC assisted encoding technique can be integrated with layering coding techniques. Rate adaptation of the transmission channel can be achieved by layering coding. The base-layer of compressed bit stream usually comprises more important data, and the enhancement layer contains less important data that is subject to a larger transmission error rate.

In one embodiment, it is preferable that the base-layer bit stream is standards compliant, and the enhancement-layer bit stream is allowed to be dropped when the transmission bandwidth decrease below a certain threshold. Under this scenario, it is desirable to:

1. partition the incoming frame sequence into base-layer frames and enhancement layer frames in such a way that there is a one-to-one relationship among each enhancement frame and each potential FRUC frame,
2. encode the base-layer frame standard compliantly,
3. interpolate a FRUC frame at the same time instance as the to-be-encoded enhancement frame, and,
4. encode the enhancement frame based on the interpolated FRUC frame.

The benefits of this approach are two folds. First, by introducing one extra prediction mode for the enhancement layer frame, the compression ratio for the enhancement layer will increase. Thus, for a fixed transmission bandwidth, the possibility of dropping the enhancement layer bit stream is decreased as it becomes more unlikely that the enhancement layer bit stream will exceed the threshold of the transmission rate where the enhancement layer will be dropped. Second, however, even if the enhancement layer bit stream has to be dropped under degrading transmission conditions, due to the way the base-layer and enhancement-layer frames are partitioned, as explained herein, the decoder can still regenerate the missing enhancement layer frame by replacing them with interpolated FRUC frames.

FIG. 1 illustrates a conventional two-layered encoding scheme of a video sequence 106, including a base layer 104 and an enhancement layer 102. I and P frames such as P frames 112 and 114 are partitioned to base layer 104 due to their importance for the correct reconstruction of video sequence 106, while the less important B frames such as B frame 110 reside in enhancement layer 102. In this prior art approach, the reconstruction of enhancement frames in enhancement layer 102 only depends on the reconstructed base-layer frames in base layer 104, but does not depend on the reconstructed frames in enhancement layer 102. Specifically, B frames in enhancement layer 102 are not used as a reference for temporal prediction of the frame in base layer 104, although B frames can be used to predict future B frames.

Figure 2:
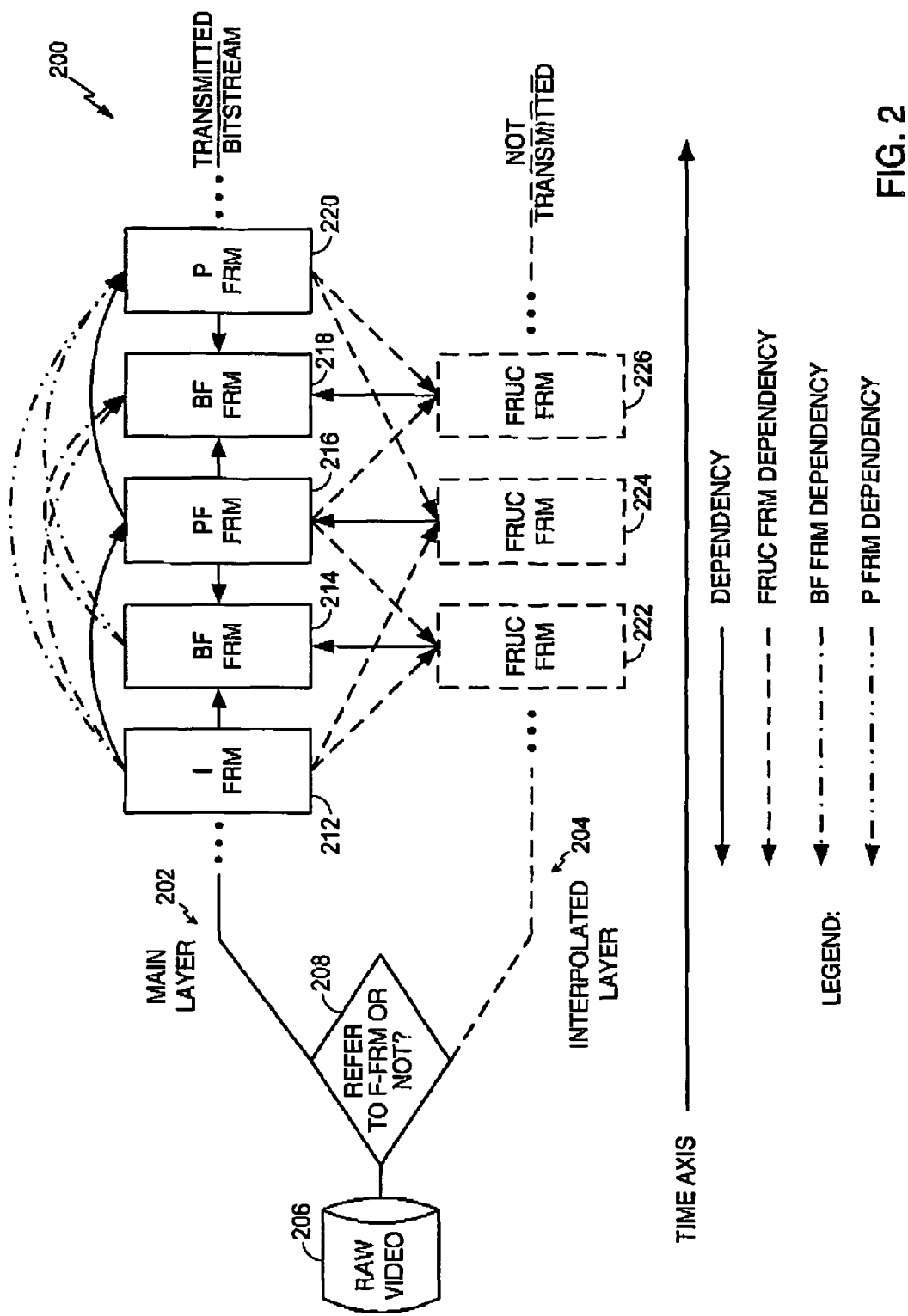
FIG. 2 is a diagram illustrating an encoding scheme configured in accordance with one embodiment, where a main layer has been encoded with the assistance of FRUC frames.

FIG. 2 illustrates a video sequence 206 encoded in accordance with one embodiment of an encoding scheme, where an I frame 212 is a standard Intra frame (a frame that does not undergo temporal prediction) and a P frame 220 is a standard Predicted frame. As seen in the figure, the frames in a main layer 202 is encoded through the use of an interpolated layer 204.

PF frame 216 are P-frames where a FRUC interpolated frame is used as one of the multiple reference pictures. For example, FRUC FRM 224 is a reference picture for PF FRM 216. In contrast, the standard approach uses I FRM 212 as the only reference picture for P frames. Thus, in one embodiment, a FRUC FRM is used as a reference picture for main layer decoding of interpolated frames.

BF frames are B-frames having FRUC interpolated frames as one of the multiple reference pictures. Thus, in one embodiment, reference pictures for BF frames may include one or more of I, B, P, PF or BF frames. For example, BF frame 214 is a B-frame having an FRUC interpolated frame 222 as one of the multiple reference pictures; and BF frame 218 is a B-frame having an FRUC interpolated frame 226 as one of the multiple reference pictures. In contrast, even though standard B (Bi-directional) predicted frames may have multiple reference pictures, these reference pictures only include I, B or P frames.

As referred to herein, the term "F frames" will refer to frames that are predicted frames with FRUC interpolated frames used as reference pictures. Thus, both PF frames and BF frames are both F frames. In one embodiment, multiple reference pictures are used for the prediction of F frames. In addition, FRUC interpolated frames may be the only reference picture used for the prediction of F frames. Further, the architecture described herein encompasses an approach where a portion of FRUC interpolated frames is used as references, such as using only specific macroblocks (which may be blocks of any size or shape) from the FRUC interpolated frame.

Figure 3:
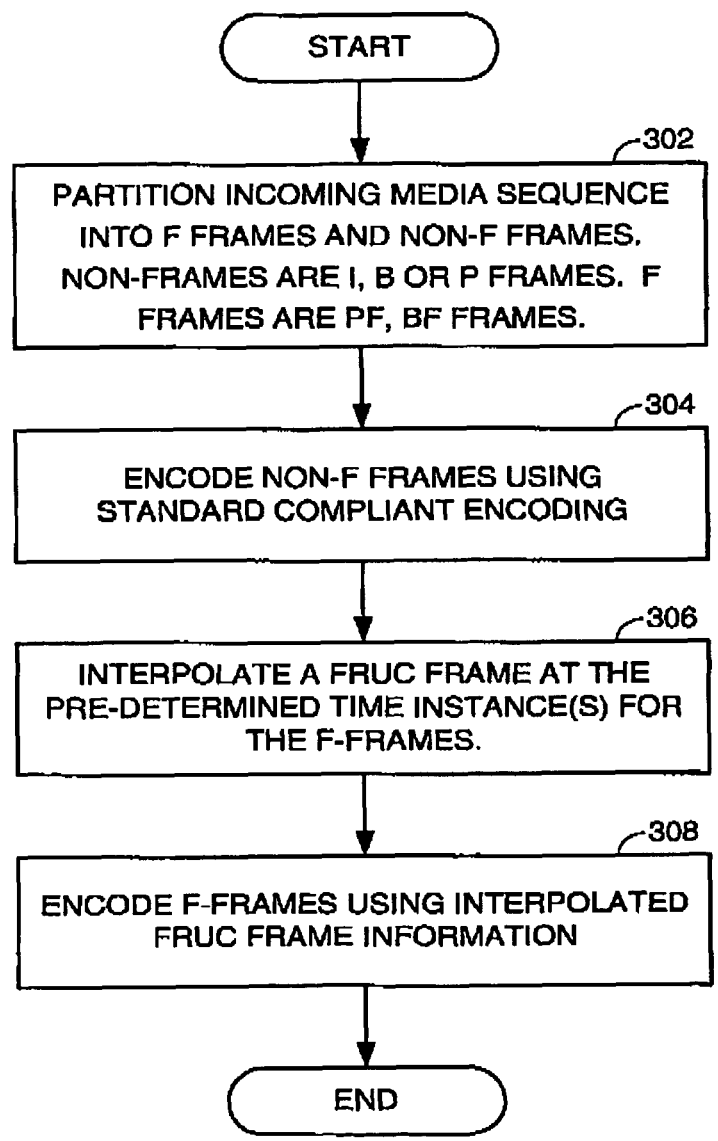
FIG. 3 is a flow diagram of a method for encoding the base layer with the assistance of FRUC frames in accordance with one embodiment.

FIG. 3 illustrates a flow diagram of an exemplary FRUC encoding process for the bitstream described above in FIG. 2. In step 302, the incoming media (video) sequence is partitioned into F frames and non F frames, where F frames are PF and BF frames, as described above, and non-F frames are I, B or P frames. In one embodiment, there is a one-to-one relationship among each F frame and each potential FRUC frame. In other embodiments, the ratio of enhancement frames to potential FRUC frame does not have to have a one-to-one correspondence. Once the video sequence has been partitioned, operation continues with step 304, where the non-F frames are encoded based on the standard encoding scheme used. For example, the coding standard as promulgated in the H.264 standard may be used for these non-F frames. Then, in step 306, a FRUC frame is interpolated at the same time instance of the to-be-encoded enhancement frame. In one embodiment, the FRUC frame may depend on both the reconstructed current frame and the stored previous frame. Other embodiments may use the other FRUC algorithms described above. In step 308, the frames in the enhancement layer are encoded with the assistance of the interpolated FRUC frame, as detailed in the description of FIG. 4. Thus, due to the availability of the FRUC frame, an extra prediction mode (FRUC mode) can be selected for the prediction frames in the main layer.

Figure 4:
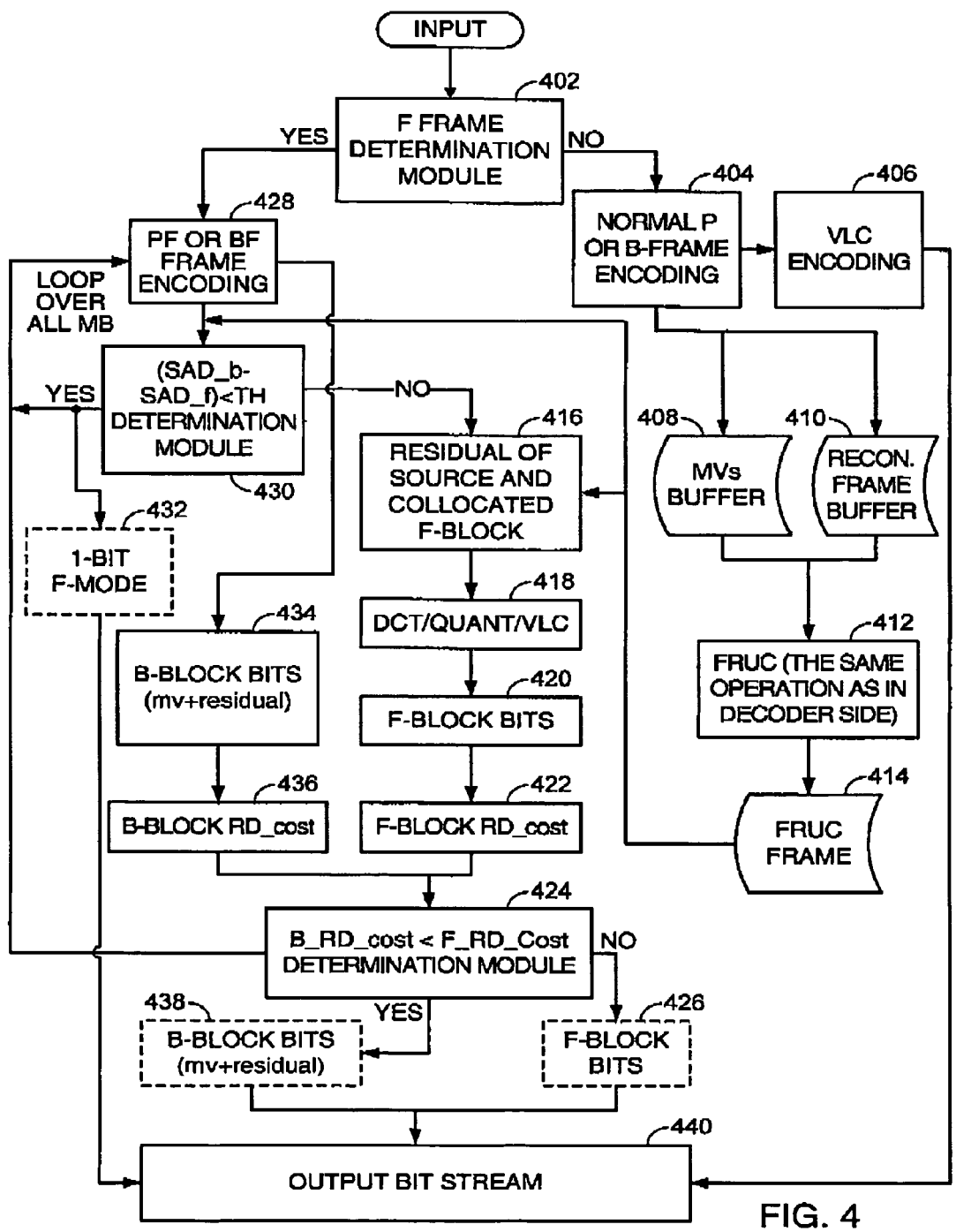
FIG. 4 is a block diagram of an encoding system configured in accordance with one embodiment.

FIG. 4 illustrates an encoder block diagram configured in accordance with one embodiment. Initially, a P frame detector 402 determines if a new frame is an F frame. If not, an P or B frame encoder 404 encodes the frame and a variable length coding (VLC) encoder 406 generates a final bit stream for the encoded P or B frame to output in an output bit stream 404. The motion vectors for the P or B frame are stored in motion vector (MV) buffer 408, while reconstructed frame buffer 410 stores a reconstructed P or B frame. A FRUC unit 412 is coupled to MV buffer 408 and reconstructed frame buffer 410 to perform a FRUC algorithm and generate a FRUC frame, which is stored in FRUC frame buffer 414. As discussed above the FRUC frames are used to generate the various F (e.g., BF or PF) frames.

If F frame detector 402 determines that a new frame is an F frame, an F frame encoding unit 428 performs a macroblock by macroblock encoding of the new F frame. The encoded F frame macroblock are sent to a block 434 that determines the number of bits that need to be transmitted for the B frame, which includes the bits necessary to transmit the motion vectors. A B frame macroblock RD_cost is then calculated in B-block RD_cost calculator 436. Further, based on the B frame encoding, a comparator 430 compares (1) the value of the sum of absolute differences (SAD) of the F frame macroblock based on the FRUC frame retrieved from FRUC frame buffer 414 (SAD_f) as subtracted from a corresponding B frame macroblock (SAD_b) to (2) a predetermined threshold value (TH). If the results of the subtraction is greater than or equal to the threshold value, then the quality degradation would be too great and thus the encoder needs to send encoder assisted FRUC frame information. In one embodiment, the threshold value is six times the block sized being used (e.g., 16×16 block size). It should be noted that although the term "macroblock" is used herein, which typically refers to a standard block size of 16×16 pixel elements, any block size may be used. In addition, the blocks may be of any shape.

If difference between the SAD of the B frame macroblock and the SAD of the F frame macroblock is less than the threshold, then the encoder will indicate that the F frame macroblock should be used in module 432 and the bit to indicate the F-mode is placed into output bit stream 440. If not, a residual of the source (original) macroblock and collocated FRUC frame block is calculated in module 416, the results of which are quantized in discrete cosine transform (DCT)/Quantization/VLC module 418. The number of FRUC frame block bits necessary to transmit the FRUC frame information is determined in F-block bits module 420, and, based on that calculation, the FRUC frame macroblock RD_cost is determined in F-block RD_cost module 422. The RD_cost calculation is described herein with regards to FIG. 5.

Based on the calculated B frame macroblock RD_cost and F frame macroblock RD_cost, comparator module 424 determines which bits to place into output bit stream 440. In one embodiment, if the B frame macroblock RD_cost is less than the F frame macroblock RD_cost, then the bits for the B frame macroblock, including the generated motion vectors, will be placed into output bit stream 440. Otherwise, the bits for the F frame macroblock will be placed into output bit stream 440.

Figure 5:
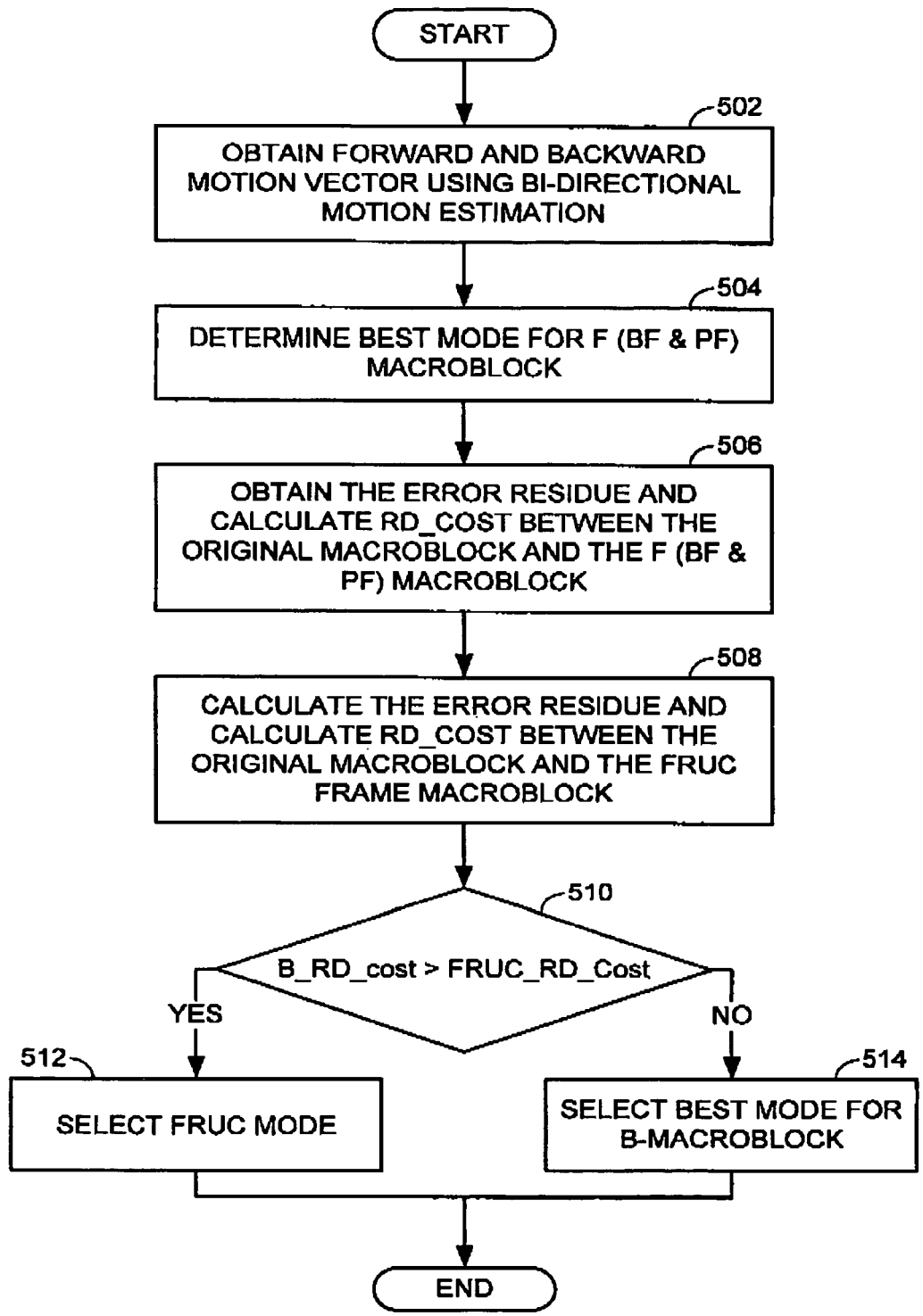
FIG. 5 is a flow diagram of a method for mode selection for encoding in accordance with one embodiment.

FIG. 5 illustrates an algorithm implemented in accordance with one embodiment for a mode selection process of an enhancement layer B frame macroblock during the encoding the frames in the enhancement layer. In step 502, the forward and backward motion vectors are obtained for the B frame macroblock. In one embodiment, the vectors are obtained by performing conventional bi-directional motion estimation. Thus, no information from a FRUC frame is used. Then, in step 504, a best mode for the B frame macroblock is determined. In on embodiment, the best mode is selected from one of three modes: a forward prediction mode, a backward prediction mode and a bi-linear prediction mode. Further, the selection of the best mode is performed without the involvement of the FRUC frame.

In step 506, an error residue is obtained between the B frame macroblock based on the selected best mode and the original macroblock from the source frame (i.e., the to-be-encoded source frame). Error residue information between the original macroblock and the FRUC frame macroblock is then obtained in step 508. In one embodiment, error residue for the B frame macroblock and FRUC frame macroblock is calculated by subtracting the original macroblock from the B frame macroblock or FRUC frame macroblock, respectively. In addition, a variable referred to as the rate distortion cost (RD_cost) is calculated for both the B frame macroblock (B_RD_cost) and the FRUC frame macroblock (FRUC_RD_cost) given by the following formula:

$$RD\_cost = Distortion + Lambda * Rate$$

In one embodiment, the Rate is the total bits used to encode a certain block (which uses the error residue of the respective macroblock), the Distortion is the distortion metric, and, Lambda is a predefined weighting factor that depends on the quantization of the macroblock. In one embodiment, Distortion is determined by a sum of absolute difference (SAD) calculation. In other embodiments, different distortion metrics may be used. Further, Lambda, in one embodiment, is an empirically derived formula dependent on the quantization parameter.

As described above, whether the FRUC frame or B frame mode of encoding is chosen is based on the sum-of-absolute-difference (SAD) value, which is effectively a measure of the distortion, and the number of bits required to encode the residual. These two values are summed, one being weighted by lambda, and the "best" mode is decided based on that which minimizes the result. The reason the summation of distortion and bit-rate is used is so the encoder can make a trade-off between image quality and bit-rate. So, for example, if the encoder encountered a highly complex macroblock that would suffer from a great deal of distortion if it used the same quantization parameter as before, it could lower the quantization value to allow for a tradeoff in distortion, even though it would require more bits to encode.

Once the error residue and, consequently, the B_RD_cost (the RD_cost of the B frame macroblock) and the error residue and, consequently, the FRUC_RD_cost (the RD_cost of the FRUC frame macroblock) have been determined, step 510 compares the costs and determines if FRUC_RD_cost is less than B_RD_cost. If so, then the FRUC mode is selected in step 512. Otherwise, the best mode as determined in step 504 is chosen in step 514.

Figure 6:
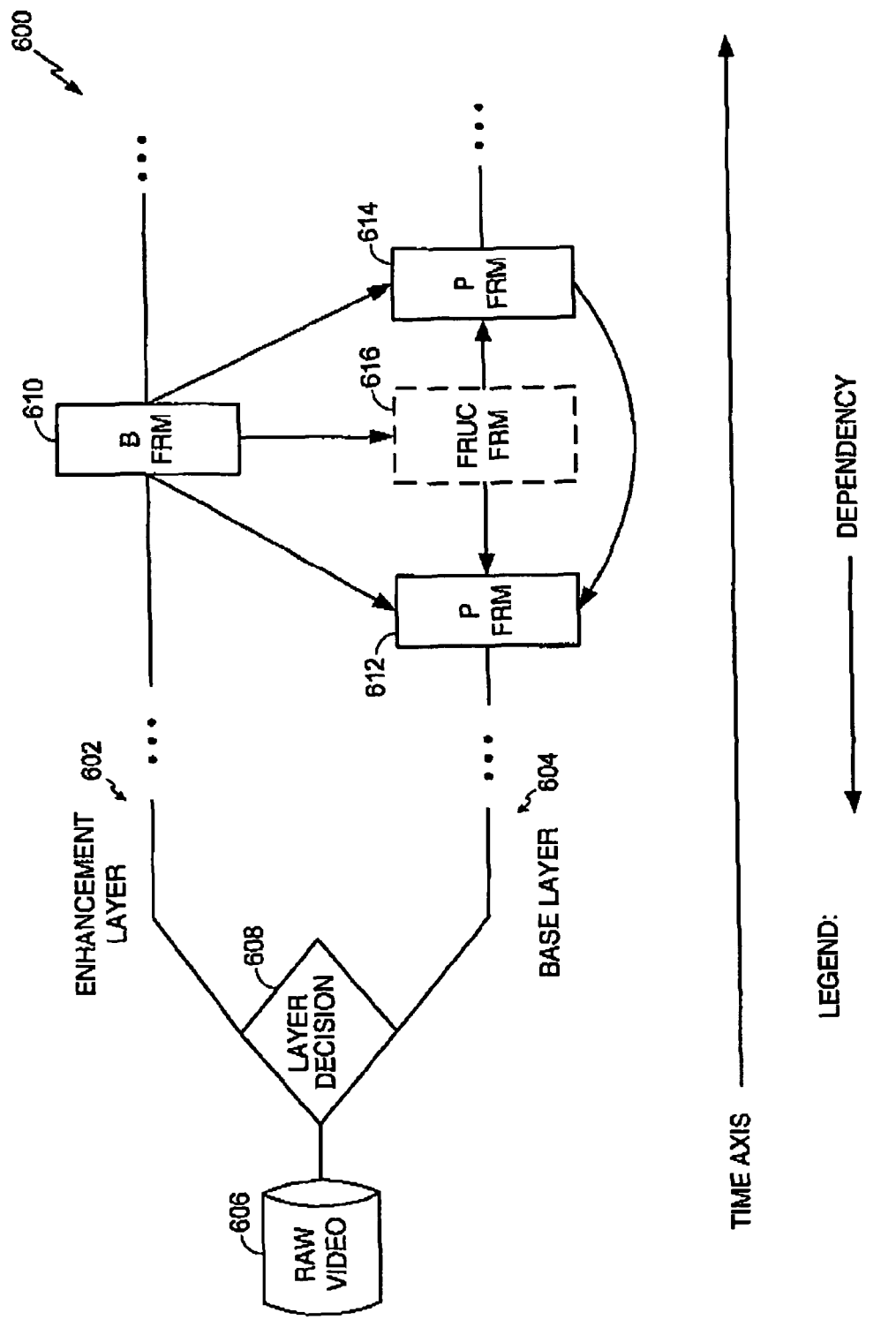
FIG. 6 is a diagram illustrating a two-layered encoding scheme configured in accordance with one embodiment, where an enhancement layer has been encoded with the assistance of FRUC frames.

FIG. 6 illustrates a video sequence 606 encoded in accordance with an encoding scheme of one embodiment, with a layer decision block 608 that partitions media data into two layers, including a base layer 604 and an enhancement layer 602. I and P frames such as P frames 612 and 614 are partitioned to base layer 604 due to their importance for the correct reconstruction of video sequence 606, while the less important B frames such as B frame 610 reside in enhancement layer 602. As illustrated in the figure, a FRUC frame 616 may also be in existence in base layer 604.

Figure 7:
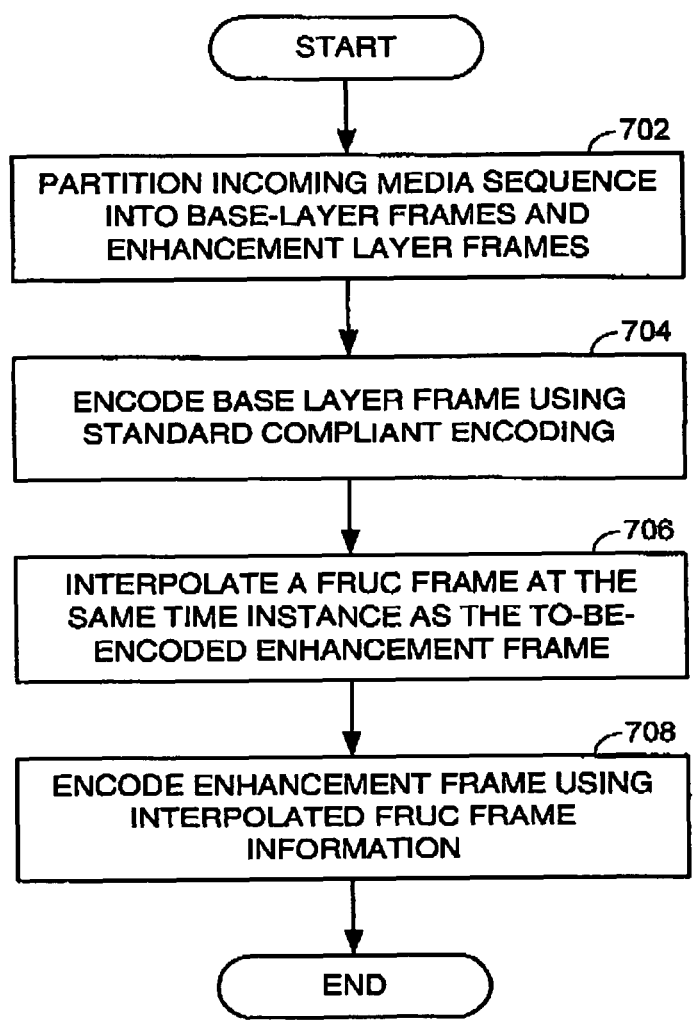
FIG. 7 is a flow diagram of a method for partitioning media data into two layers and to encode the enhancement layer with the assistance of FRUC frames in accordance with one embodiment; and, FIG. 8 is a block diagram of an access terminal and an access point of a wireless system.

FIG. 7 illustrates a flow diagram of a FRUC encoding process in accordance with one embodiment, as described above. In step 702, the incoming media (video) sequence is partitioned into base layer frames and enhancement layer frames. In one embodiment, there is a one-to-one relationship among each enhancement frame and each potential FRUC frame. In other embodiments, the ratio of enhancement frames to potential FRUC frame does not have to have a one-to-one correspondence. Once the video sequence has been partitioned, operation continues with step 704, where the frames in the base-layer are encoded based on the standard encoding scheme used. For example, the coding standard as promulgated in the H.264 standard may be used. Then, in step 706, a FRUC frame is interpolated at the same time instance of the to-be-encoded enhancement frame. In one embodiment, the FRUC frame may depend on both the reconstructed current frame and the stored previous frame. Other embodiments may use the other FRUC algorithms described above. In step 708, the frames in the enhancement layer are encoded with the assistance of the interpolated FRUC frame.

It should be noted that the modules and processing blocks mentioned herein may be implemented in a variety of hardware/software implementations. Thus, one of ordinary skill in the art would understand that, for example, the same processor may perform the FRUC operation as well as the SAD calculations. Further, a digital signal processor (DSP) or other specialized processor may be used in conjunction with a general purpose processor to implement the functions described herein. References to modules or units performing a specific function or functions should not be limited to include a particular circuit for performing said function or functions, but may, again, include a processor configured to perform said function or functions.

The present invention achieves savings in the transmitted bit stream for very little to no compromise in visual quality, as based on the mode selection method described above. For example, there is a bit-rate/bandwidth reduction by augmentation of the standard (H.26X/MPEG-X) bit stream syntax at the same quality level. This will decrease the possibility of dropping the enhancement bit stream, and consequently, improve reconstructed video quality. In one embodiment, in encoding the enhancement layer, motion vector information need not be transmitted since that information can be recovered/computed at the decoder through simple interpolation functions. Thus all of the bit rate savings can be realized.

In addition, computational scalability may be achieved by the adaptive selection of an appropriate FRUC algorithm based on the optimal usage of the receiver's hardware resources. For example, if the decoder has built-in motion estimation accelerator, the seeded ME assisted MCI with MV processing FRUC algorithm may be selected. Better temporal scalability may be achieved as, by using the FRUC features, the video will playback full frame rate where FRUC frames are inserted only when the base-layer bit stream is received. Power savings at the decoder may also be obtained, particularly in handhelds, where FRUC assisted reconstruction of the video stream requires fewer cycles than the reconstruction of a complete B frame.

It is predicted that B frames occupy up to 30% of the total bit rate when an IBP group of pictures (GOP) structure is used. Hence, the present invention, by reducing the data allocated for transmitting B frames, may decrease the overall bit rate. For example, for IBP GOP structures, the bit rate may be reduced by up to 15% when both the base and enhancement layers are put together. This percentage goes up when IBBP GOP or IBBBP GOP structures are used as these structures utilize more B frames. More for those with more number of B frames between I and P.

Figure 8:
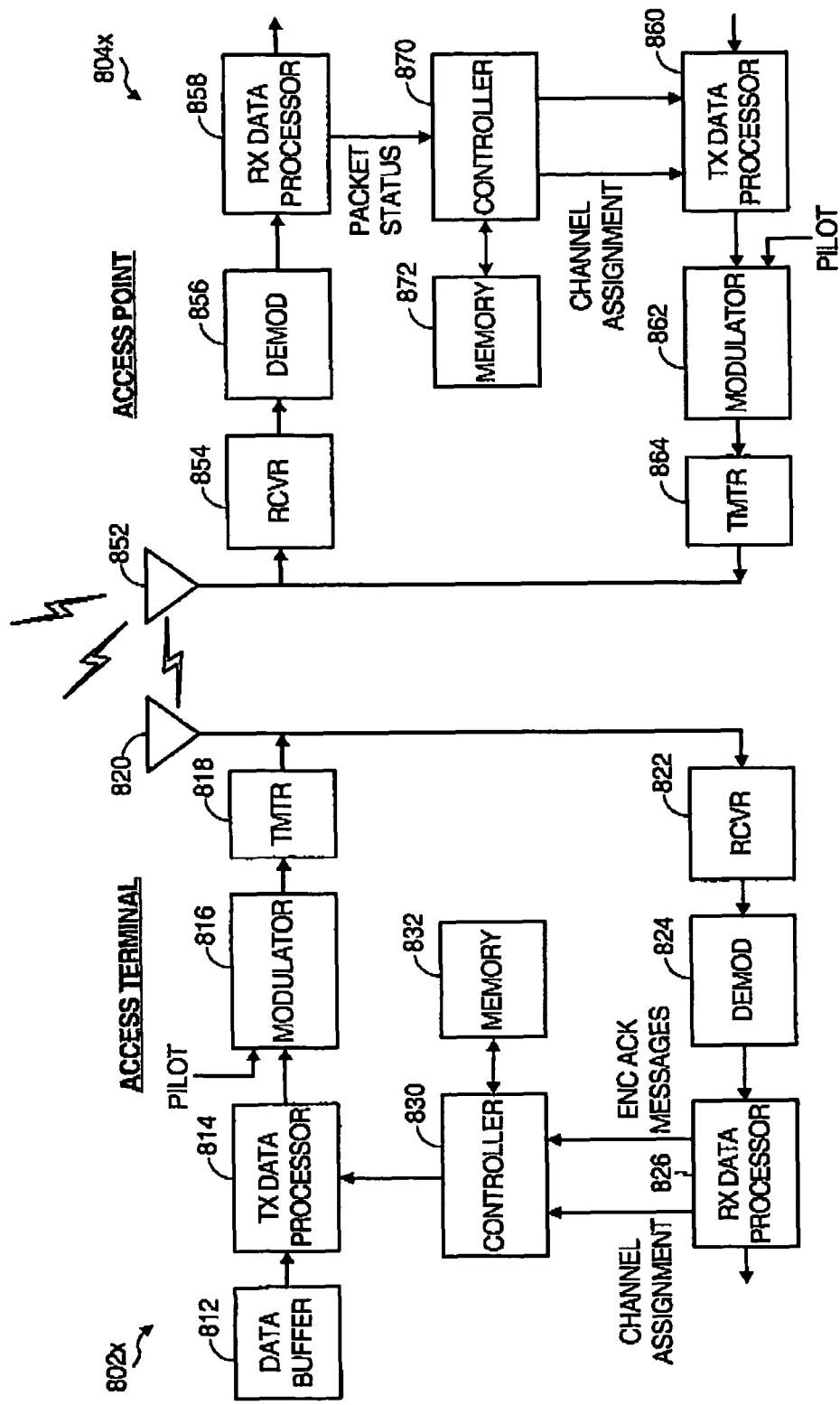

FIG. 8 shows a block diagram of an access terminal 802x and an access point 804x in a wireless system. An "access terminal," as discussed herein, refers to a device providing voice and/or data connectivity to a user. The access terminal may be connected to a computing device such as a laptop computer or desktop computer, or it may be a self contained device such as a personal digital assistant. The access terminal can also be referred to as a subscriber unit, mobile station, mobile, remote station, remote terminal, user terminal, user agent, or user equipment. The access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem. An "access point," as discussed herein, refers to a device in an access network that communicates over the air-interface, through one or more sectors, with the access terminals. The access point acts as a router between the access terminal and the rest of the access network, which may include an IP network, by converting received air-interface frames to IP packets. The access point also coordinates the management of attributes for the air interface.

For the reverse link, at access terminal $802x$, a transmit (TX) data processor 814 receives traffic data from a data buffer 812, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 816 receives the data symbols, pilot symbols, and possibly signaling for the reverse link, performs (e.g., OFDM) modulation and/or other processing as specified by the system, and provides a stream of output chips. A transmitter unit (TMTR) 818 processes (e.g., converts to analog, filters, amplifies, and frequency upconversion) the output chip stream and generates a modulated signal, which is transmitted from an antenna 820.

At access point $804x$, the modulated signals transmitted by access terminal $802x$ and other terminals in communication with access point $804x$ are received by an antenna 852. A receiver unit (RCVR) 854 processes (e.g., conditions and digitizes) the received signal from antenna 852 and provides received samples. A demodulator (Demod) 856 processes (e.g., demodulates and detects) the received samples and provides detected data symbols, which are noisy estimate of the data symbols transmitted by the terminals to access point $804x$. A receive (RX) data processor 858 processes (e.g., symbol demaps, deinterleaves, and decodes) the detected data symbols for each terminal and provides decoded data for that terminal.

For the forward link, at access point $804x$, traffic data is processed by a TX data processor 860 to generate data symbols. A modulator 862 receives the data symbols, pilot symbols, and signaling for the forward link, performs (e.g., OFDM) modulation and/or other pertinent processing, and provides an output chip stream, which is further conditioned by a transmitter unit 864 and transmitted from antenna 852. The forward link signaling may include power control commands generated by a controller 870 for all terminals transmitting on the reverse link to access point $804x$. At access terminal $802x$, the modulated signal transmitted by access point $804x$ is received by antenna 820, conditioned and digitized by a receiver unit 822, and processed by a demodulator 824 to obtain detected data symbols. An RX data processor 826 processes the detected data symbols and provides decoded data for the terminal and the forward link signaling. Controller 830 receives the power control commands, and controls data transmission and transmit power on the reverse link to access point $804x$. Controllers 830 and 870 direct the operation of access terminal $802x$ and access point $804x$, respectively. Memory units 832 and 872 store program codes and data used by controllers 830 and 870, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the invention. Various modifications to these embodiments may be readily apparent to those skilled in the art, and the generic principles defined herein may be applied to other embodiments, e.g., in an instant messaging service or any general wireless data communication applications, without departing from the spirit or scope of the described embodiments. Thus, the scope of the description is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as advantageous over other embodiments.

What is claimed is:

1. A video-encoder processor for encoding a video stream having a plurality of frames, the video encoder processor comprising:
   a frame rate-up-conversion (FRUC) module, the FRUC module generating a FRUC frame with reference to a first frame of the video stream;
   a rate distortion cost (RD_cost) calculation module coupled to the FRUC module and configured to:
      receive the FRUC frame and calculate a first cost based on a macroblock of the FRUC frame, wherein the first cost includes a cost of predicting a macroblock of a subsequent frame of the video stream from the macroblock of the FRUC frame; and
      receive the first frame and calculate a second cost based on a macroblock of the first frame, wherein the second cost includes a cost of predicting the macroblock of the subsequent frame of the video stream from the macroblock of the first frame; and
   a mode decision module coupled to the RD_cost calculation module, the mode decision module configured to:
      compare the first cost and the second cost;
      encode the macroblock of the subsequent frame using the macroblock of the FRUC frame if the first cost is less than the second cost; and
      encode the macroblock of the subsequent frame using the macroblock of the first frame if the first cost is greater than the second cost.

2. The video-encoder processor of claim 1, wherein the mode-decision module is further configured to select a F frame encoding mode for the subsequent frame of the video stream when the first cost is lower than a B frame macroblock RD_cost for a corresponding macroblock in a corresponding B frame, wherein the F frame encoding mode comprises a mode indicating that the subsequent frame is to be encoded with the FRUC frame.

3. The video-encoder processor of claim 2, further comprising a B frame encoder, the B frame encoder generating the corresponding B frame.

4. The video-encoder processor of claim 1, further comprising a sum-of-absolute difference (SAD) calculation module coupled to the FRUC module, the SAD calculation module configured to calculate a SAD value based on the macroblock in one of a plurality of FRUC frames and a SAD value for the corresponding macroblock in the corresponding first frame.

5. The video encoder processor of claim 4, wherein the SAD calculation module is configured to calculate a difference of the SAD value based on the macroblock in one of the plurality of FRUC frames and the SAD value for the corresponding macroblock in the corresponding first frame, and to compare the difference to a predetermined threshold, the SAD calculation module generating a single bit to indicate a F frame mode if the difference is lower than the predetermined threshold.

6. A method for encoding a video stream having a plurality of frames, the method comprising:
   generating a frame rate up conversion (FRUC) frame with reference to a first frame of the video stream;
   calculating a first cost as a F frame macroblock RD_cost based on a macroblock in one of the plurality of FRUC frames, wherein the first cost includes a cost of predicting a macroblock of a subsequent frame of the video stream from the macroblock in the FRUC frame;
   calculating a second cost as a RD_cost for a corresponding macroblock in a corresponding first frame;
   comparing the first cost and the second cost;
   selecting an encoding scheme for the subsequent frame of the video stream based on the result of the comparison;
   encoding the macroblock of the subsequent frame of the video stream using the macroblock in the corresponding first frame if the first cost is greater than the second cost; and
   encoding the macroblock of the subsequent frame of the video stream using the macroblock in the FRUC frame if the first cost is less than the second cost.

7. An apparatus for encoding a video stream having a frame, comprising:
   means for generating a frame rate up conversion (FRUC) frame with reference to a first frame of the video stream;
   means for calculating a first cost as a F frame macroblock RD_cost based on a macroblock of the FRUC frame, wherein the first cost includes a cost of predicting a macroblock of a subsequent frame of the video stream from the macroblock in the FRUC frame;
   means for comparing the calculated F frame macroblock RD_cost to a B frame macroblock RD_cost for a corresponding macroblock in a corresponding B frame;
   means for calculating a second cost as a RD_cost for a corresponding macroblock in a corresponding first frame;
   means for selecting an encoding scheme for the subsequent frame of the video stream based on the result of the comparison; and
   means for encoding the macroblock of the subsequent frame of the video stream using the macroblock in the corresponding first frame if the first cost is greater than the second cost; and means for encoding the macroblock of the subsequent frame of the video stream using the macroblock in the FRUC frame if the first cost is less than the second cost.

8. A non-transitory computer-readable medium having instructions stored thereon, the stored instructions, when executed by a processor, cause the processor to perform a method for encoding a video stream having a frame, the method comprising:

generating a frame rate up conversion (FRUC) frame with reference to a first frame of the video stream;

calculating a first cost as a F frame macroblock RD_cost based on a macroblock in one of the plurality of FRUC frames, wherein the first cost includes a cost of predicting a macroblock of a subsequent frame of the video stream from the macroblock in the FRUC frame;

calculating a second cost as a RD_cost for a corresponding macroblock in a corresponding first frame;

comparing the first cost and the second cost;

selecting an encoding scheme for the subsequent frame of the video stream based on the result of the comparison;

encoding the macroblock of the subsequent frame of the video stream using the macroblock in the corresponding first frame if the first cost is greater than the second cost; and encoding the macroblock of the subsequent frame of the video stream using the macroblock in the FRUC frame if the first cost is less than the second cost.

\* \* \* \* \*